US011554545B2

(12) United States Patent
Anegawa et al.

(10) Patent No.: US 11,554,545 B2
(45) Date of Patent: Jan. 17, 2023

(54) METHOD FOR PRODUCING THREE-DIMENSIONAL SHAPED ARTICLE AND THREE-DIMENSIONAL SHAPING APPARATUS

(71) Applicant: SEIKO EPSON CORPORATION, Tokyo (JP)

(72) Inventors: Kenta Anegawa, Matsumoto (JP); Daizo Aoyagi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 175 days.

(21) Appl. No.: 16/727,397

(22) Filed: Dec. 26, 2019

(65) Prior Publication Data

US 2020/0207016 A1    Jul. 2, 2020

(30) Foreign Application Priority Data

Dec. 28, 2018  (JP) .............................. JP2018-246552

(51) Int. Cl.
*B29C 64/188* (2017.01)
*B33Y 10/00* (2015.01)
(Continued)

(52) U.S. Cl.
CPC .......... *B29C 64/188* (2017.08); *B29C 64/118* (2017.08); *B29C 64/209* (2017.08);
(Continued)

(58) Field of Classification Search
CPC ....... B29C 64/118; B33Y 10/00; B33Y 30/00; B33Y 50/02
See application file for complete search history.

(56) References Cited

U.S. PATENT DOCUMENTS 10,254,499 B1 * 4/2019 Cohen ...................... G02B 6/25
10,875,242 B2   12/2020 Saito et al.
(Continued)

FOREIGN PATENT DOCUMENTS

JP    2006-192710 A    7/2006
JP    2016-055603 A    4/2016
(Continued)

OTHER PUBLICATIONS

Office Action for JP Patent Application No. JP2018246552, dated MM DD, YYYY, 4 pages of Office Action.

*Primary Examiner* — Yung-Sheng M Tsui
*Assistant Examiner* — Melody Tsui
(74) *Attorney, Agent, or Firm* — Chip Law Group

(57) ABSTRACT

A method for producing a three-dimensional shaped article includes a first shaping step of shaping a first portion of the three-dimensional shaped article by ejecting a shaping material to a stage, and a second shaping step of shaping a second portion of the three-dimensional shaped article having an overlapping portion overlapping with the first portion, and a non-overlapping portion that does not overlap with the first portion, that forms a space between the same and the first portion, and that is in contact with the overlapping portion at one end. In the second shaping step, the overlapping portion is shaped by ejecting the shaping material onto the first portion, and thereafter, the non-overlapping portion is shaped by ejecting the shaping material so as to be in contact with the overlapping portion.

4 Claims, 9 Drawing Sheets

(51) Int. Cl.
 *B33Y 30/00* (2015.01)
 *B29C 64/209* (2017.01)
 *B29C 64/118* (2017.01)
 *B29C 64/393* (2017.01)
 *B33Y 50/02* (2015.01)

(52) U.S. Cl.
 CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2006/0158456 A1* | 7/2006 | Zinniel | B29C 64/188 |
| | | | 345/589 |
| 2016/0311165 A1* | 10/2016 | Mark | B29C 64/393 |
| 2017/0021565 A1* | 1/2017 | Deaville | B29C 70/386 |
| 2017/0232674 A1* | 8/2017 | Mark | B33Y 30/00 |
| | | | 264/308 |
| 2017/0326802 A1* | 11/2017 | Mark | B29C 64/209 |
| 2018/0237627 A1* | 8/2018 | Liu | B29C 64/118 |
| 2018/0243984 A1 | 8/2018 | Hayashida et al. | |
| 2019/0030822 A1* | 1/2019 | Touma | B33Y 50/02 |
| 2019/0277475 A1* | 9/2019 | Hikmet | F21V 3/02 |
| 2020/0147876 A1* | 5/2020 | Susnjara | B29C 64/10 |

FOREIGN PATENT DOCUMENTS

| | | | |
|---|---|---|---|
| JP | 2016203425 A | | 12/2016 |
| JP | 2018192624 A | | 12/2018 |
| WO | WO-2017/038985 A1 | | 3/2017 |

* cited by examiner

METHOD FOR PRODUCING THREE-DIMENSIONAL SHAPED ARTICLE AND THREE-DIMENSIONAL SHAPING APPARATUS

The present application is based on, and claims priority from JP Application Serial Number 2018-246552, filed on Dec. 28, 2018, the disclosure of which is hereby incorporated by reference herein in its entirety.

BACKGROUND

1. Technical Field

The present disclosure relates to a method for producing a three-dimensional shaped article and a three-dimensional shaping apparatus.

2. Related Art

For example, JP-A-2006-192710 (Patent Document 1) discloses a method for forming a three-dimensional shaped article by extruding a molten thermoplastic material onto a base from an extrusion nozzle scanning according to preset shape data, and further stacking a molten material on the material cured on the base.

In the above-mentioned method, even when a nozzle scanning path for shaping an upper layer is set so as to overlap with a nozzle scanning path for shaping a lower layer, due to shrinkage of the actually shaped lower layer, when the upper layer is shaped according to the set scanning path, there is a possibility that the lower layer does not exist in a place to which the shaping material is ejected from a nozzle, and therefore, a three-dimensional shaped article becomes smaller than a desired shape and the shaping accuracy of the three-dimensional shaped article is affected.

SUMMARY

An advantage of some aspects of the present application is to improve the shaping accuracy of the three-dimensional shaped article.

According to an aspect of the present disclosure, a method for producing a three-dimensional shaped article is provided. This method for producing a three-dimensional shaped article includes a first shaping step of shaping a first portion of the three-dimensional shaped article by ejecting a shaping material to a stage, and a second shaping step of shaping a second portion of the three-dimensional shaped article having an overlapping portion overlapping with the first portion, and a non-overlapping portion that does not overlap with the first portion, that forms a space between the same and the first portion, and that is in contact with the overlapping portion at one end. In the second shaping step, the overlapping portion is shaped by ejecting the shaping material onto the first portion, and thereafter, the non-overlapping portion is shaped by ejecting the shaping material so as to be in contact with the overlapping portion.

DESCRIPTION OF EXEMPLARY EMBODIMENTS

A. First Embodiment

Figure 1:
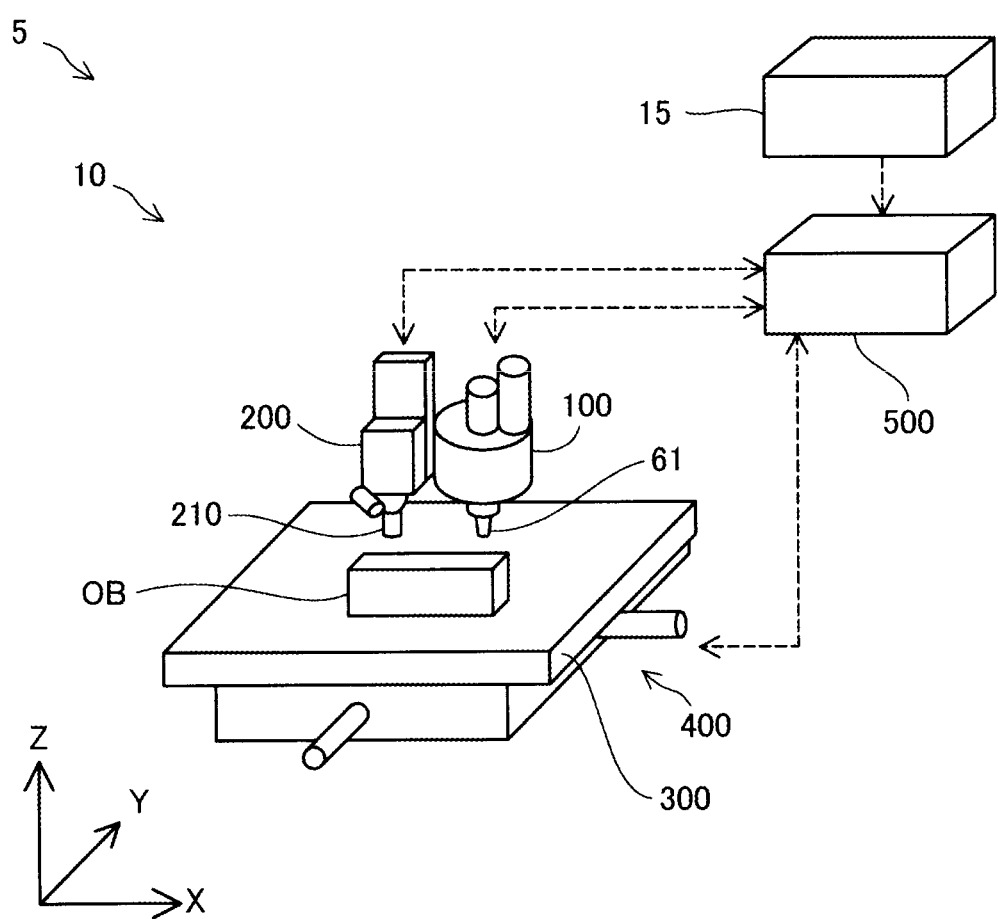
FIG. 1 is an explanatory view showing a schematic configuration of a three-dimensional shaping system in a first embodiment.

FIG. 1 is an explanatory view showing a schematic configuration of a three-dimensional shaping system 5 in a first embodiment. In FIG. 1, arrows along the X, Y, and Z directions orthogonal to one another are shown. The X direction and the Y direction are directions along the horizontal direction, and the Z direction is a direction along the vertical direction. In also the other drawings, arrows along the X, Y, and Z directions are shown as appropriate. The X, Y, and Z directions in FIG. 1 and the X, Y, and Z directions in the other drawings indicate the same directions.

The three-dimensional shaping system 5 in this embodiment includes a three-dimensional shaping apparatus 10 and information processing apparatus 15. The three-dimensional shaping apparatus 10 includes an ejection unit 100, a cutting unit 200, a shaping stage 300, a moving mechanism 400, and a controller 500. The three-dimensional shaping apparatus 10 stacks a shaping material on the shaping stage 300 by driving the moving mechanism 400 so as to change the relative position of a nozzle 61 provided in the ejection unit 100 to the shaping stage 300 while ejecting the shaping material to the shaping stage 300 from the nozzle 61 under the control of the controller 500. A detailed configuration of the ejection unit 100 will be described later with reference to FIG. 2. The shaping stage 300 is sometimes simply referred to as "stage".

The three-dimensional shaping apparatus 10 in this embodiment cuts the shaping material stacked on the shaping stage 300 by driving the moving mechanism 400 so as to change the relative position of a cutting tool 210 attached to the cutting unit 200 to the shaping stage 300 while rotating the cutting tool 210 under the control of the controller 500. The three-dimensional shaping apparatus 10 forms a three-dimensional shaped article OB having a desired shape in this manner.

The cutting unit 200 is a cutting device performing cutting of the shaping material stacked on the shaping stage 300 by rotating the cutting tool 210 attached to a shaft of a head tip. As the cutting tool 210, for example, a flat end mill or a ball end mill can be used. The cutting unit 200 detects the position of the tip of the cutting tool 210 by a general position detection sensor and transmits the detection result to the controller 500. The controller 500 controls the relative positional relationship between the cutting tool 210 and the stacked shaping material by the below-mentioned moving mechanism 400 using this detection result and performs cutting. The cutting unit 200 may include a static eliminator such as an ionizer.

The moving mechanism 400 changes the relative position of the ejection unit 100 and the cutting unit 200 to the shaping stage 300. In this embodiment, the moving mechanism 400 moves the shaping stage 300 with respect to the ejection unit 100 and the cutting unit 200. The moving mechanism 400 in this embodiment is constituted by a three-axis positioner for moving the shaping stage 300 in three axis directions of the X, Y, and Z directions by driving forces of three motors. Each motor drives under the control of the controller 500. The moving mechanism 400 need not be configured to move the shaping stage 300, but may be configured to move the ejection unit 100 and the cutting unit 200 without moving the shaping stage 300. The moving mechanism 400 may be configured to move both the ejection unit 100 or the cutting unit 200 and the shaping stage 300.

The controller 500 is constituted by a computer including one or more processors, a main storage device, and an input/output interface for performing signal input/output to/from the outside. In this embodiment, the controller 500 exhibits various functions by execution of a program or a command read on the main storage device by the processor. The controller 500 need not be constituted by a computer, but may be constituted by a combination of a plurality of circuits.

The information processing apparatus 15 is coupled to the controller 500 of the three-dimensional shaping apparatus 10. The information processing apparatus 15 generates shaping path data and cutting path data for the controller 500 to control the ejection unit 100, the cutting unit 200, and the moving mechanism 400 using three-dimensional shaping data representing the shape of the three-dimensional shaped article OB. Detailed shaping path data and cutting path data will be described later with reference to FIGS. 6 and 7. The information processing apparatus 15 is constituted by a computer including one or more processors, a main storage device, and an input/output interface for performing signal input/output to/from the outside. In this embodiment, the information processing apparatus 15 exhibits various functions by execution of a program or a command read on the main storage device by the processor. The information processing apparatus 15 need not be constituted by a computer, but may be constituted by a combination of a plurality of circuits.

Figure 2:
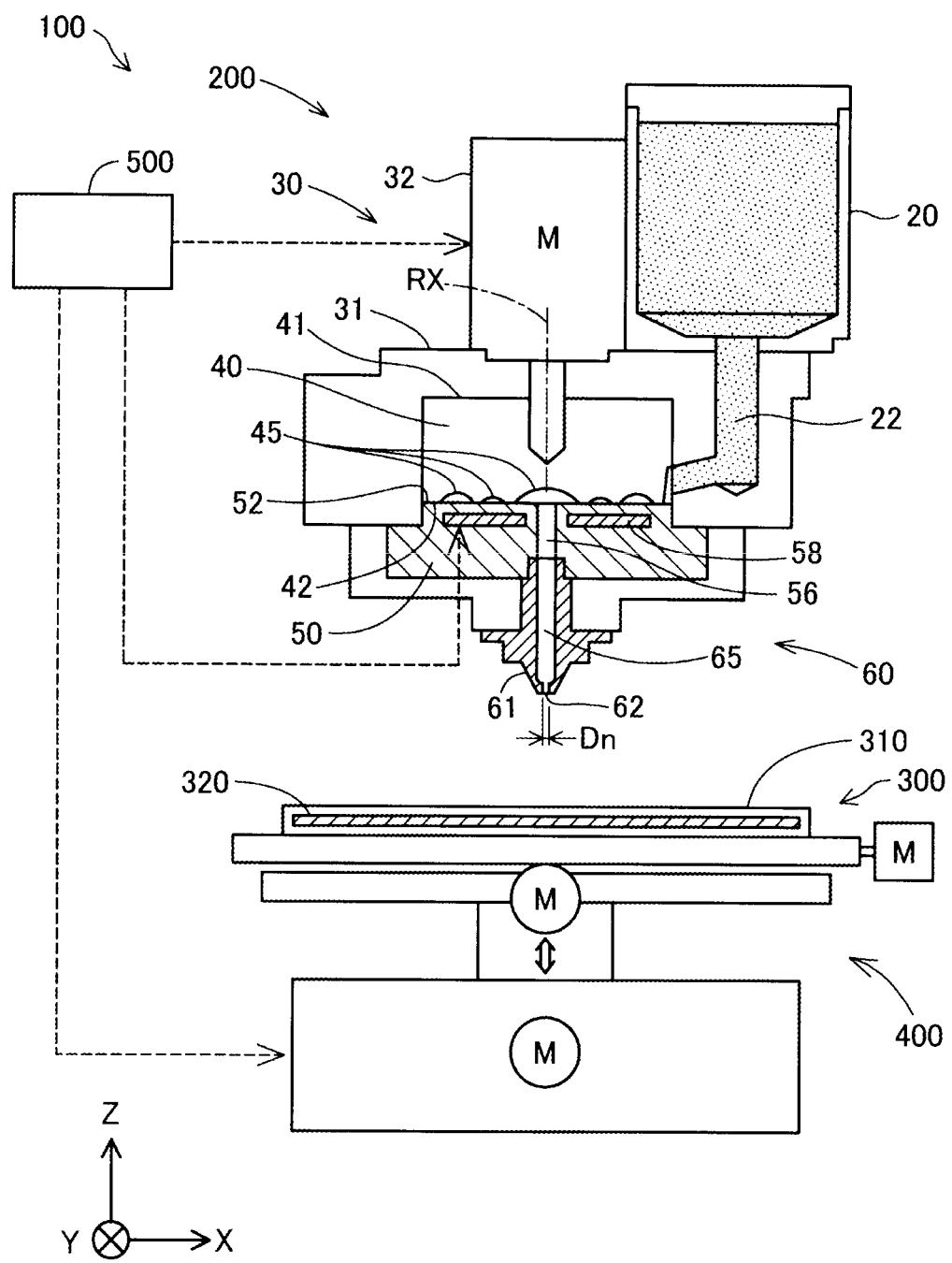
FIG. 2 is an explanatory view showing a schematic configuration of an ejection unit in the first embodiment.

FIG. 2 is an explanatory view showing a schematic configuration of the ejection unit 100 in this embodiment. The ejection unit 100 includes a material storage portion 20, a melting portion 30, and an ejection portion 60. To the material storage portion 20, a material in a state of a pellet, a powder, or the like is fed. The material in this embodiment is an ABS resin in a pellet form. The material storage portion 20 in this embodiment is constituted by a hopper. The material storage portion 20 and the melting portion 30 are coupled to each other through a supply channel 22 provided below the material storage portion 20. The material fed to the material storage portion 20 is supplied to the melting portion 30 through the supply channel 22.

The melting portion 30 includes a screw case 31, a driving motor 32, a flat screw 40, and a barrel 50. The melting portion 30 melts at least a part of the material in a solid state supplied from the material storage portion 20 to form a shaping material in a paste form having fluidity, and supplies the shaping material to the nozzle 61. The flat screw 40 is sometimes simply referred to as "screw".

The screw case 31 houses the flat screw 40. To an upper face of the screw case 31, the driving motor 32 is fixed. A rotating shaft of the driving motor 32 is coupled to an upper face 41 of the flat screw 40.

The flat screw 40 has a substantially columnar shape whose height in a direction along a central axis RX is smaller than the diameter. The flat screw 40 is disposed in the screw case 31 so that the central axis RX becomes parallel to the Z direction. The flat screw 40 rotates around the central axis RX in the screw case 31 due to a torque generated by the driving motor 32.

The flat screw 40 has a groove formed face 42 at an opposite side to the upper face 41 in a direction along the central axis RX. In the groove formed face 42, a groove portion 45 is formed. A detailed shape of the groove formed face 42 of the flat screw 40 will be described later with reference to FIG. 3.

The barrel 50 is provided below the flat screw 40. The barrel 50 has a screw opposed face 52 opposed to the groove formed face 42 of the flat screw 40. The barrel 50 has a built-in heater 58 at a position opposed to the groove portion 45 of the flat screw 40. The temperature of the heater 58 is controlled by the controller 500. The heater 58 is sometimes referred to as "heating portion".

At the center of the screw opposed face 52, a communication hole 56 is provided. The communication hole 56 communicates with the nozzle 61. A detailed shape of the screw opposed face 52 of the barrel 50 will be described later with reference to FIG. 4.

The ejection portion 60 includes the nozzle 61. The nozzle 61 is provided with a nozzle channel 65 and a nozzle hole 62. The nozzle channel 65 communicates with the communication hole 56 of the melting portion 30. The nozzle hole 62 is an opening portion that communicates with the nozzle channel 65 and that is provided at a tip portion of the nozzle 61. The forming material supplied to the nozzle 61 from the melting portion 30 is ejected from the nozzle hole 62. In this embodiment, the nozzle 61 is provided with the nozzle hole 62 in a circular shape. The diameter of the nozzle hole 62 is referred to as "nozzle diameter Dn". The shape of the nozzle hole 62 is not limited to a circular shape and may be a quadrangular shape or the like.

Figure 3:
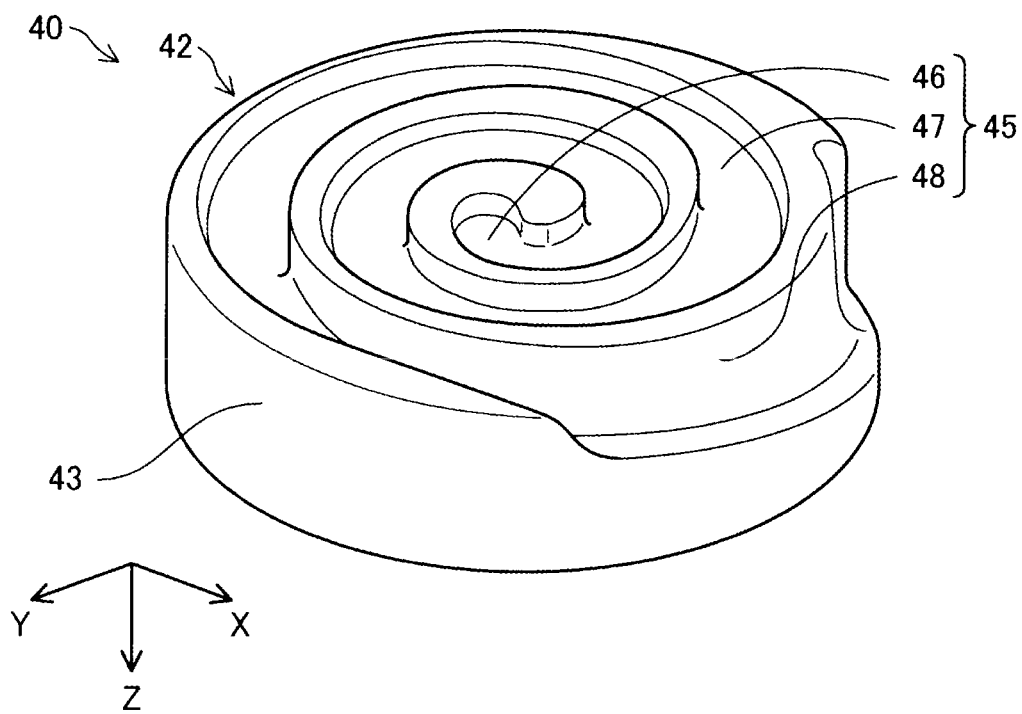
FIG. 3 is a perspective view showing a configuration of a groove formed face of a flat screw in the first embodiment.

FIG. 3 is a perspective view showing a configuration of the groove formed face 42 of the flat screw 40 in this embodiment. The flat screw 40 shown in FIG. 3 is shown in a state where the vertical positional relationship shown in FIG. 2 is reversed for facilitating the understanding of the technique. In the groove formed face 42 of the flat screw 40, the groove portion 45 is formed as described above. The groove portion 45 includes a central portion 46, a spiral portion 47, and a material introduction portion 48.

The central portion 46 is a circular recess formed around the central axis RX of the flat screw 40. The central portion 46 is opposed to the communication hole 56 provided in the barrel 50.

The spiral portion 47 is a groove extending in a spiral shape so as to draw an arc toward the outer circumference of the groove formed face 42 with the central portion 46 as the center. The spiral portion 47 may be configured to extend in an involute curve shape or in a helical shape. One end of the spiral portion 47 is coupled to the central portion 46. The other end of the spiral portion 47 is coupled to the material introduction portion 48.

The material introduction portion 48 is a groove wider than the spiral portion 47 provided at the outer peripheral edge of the groove formed face 42. The material introduction portion 48 is continuous to a side face 43 of the flat screw 40. The material introduction portion 48 introduces the material supplied from the material storage portion 20 into the spiral portion 47 through the supply channel 22. In FIG. 3, a form in which a single streak of spiral portion 47 and a single streak of material introduction portion 48 are provided toward the outer circumference from the central portion 46 of the flat screw 40 is shown, however, a plurality of streaks of spiral portions 47 and a plurality of streaks of material introduction portions 48 may be provided toward the outer circumference from the central portion 46 of the flat screw 40.

Figure 4:
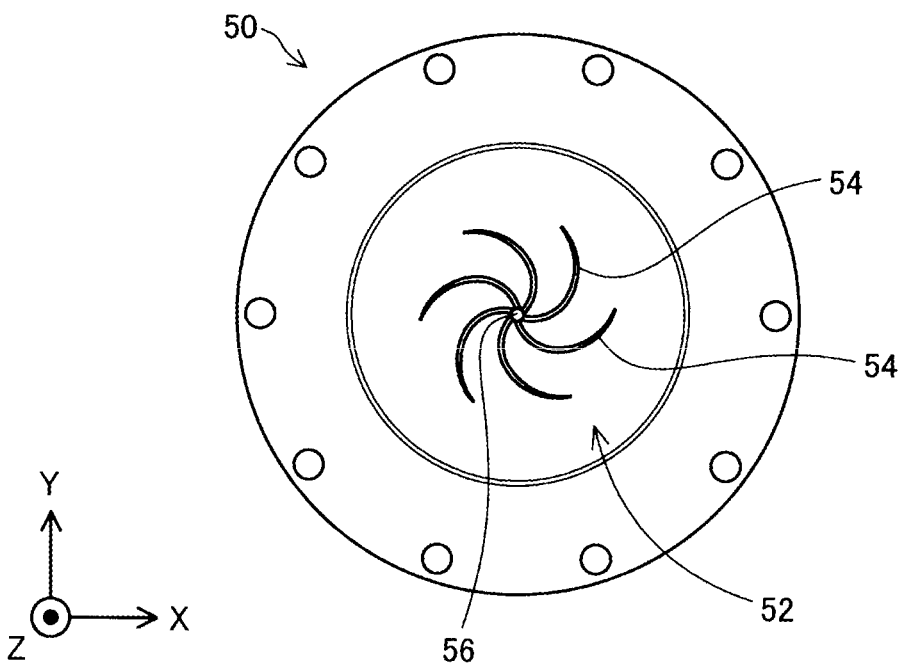
FIG. 4 is a top view showing a configuration of a screw opposed face of a barrel in the first embodiment.

FIG. 4 is a top view showing a configuration of the screw opposed face 52 of the barrel 50 in this embodiment. As described above, at the center of the screw opposed face 52, the communication hole 56 communicating with the nozzle 61 is formed. Around the communication hole 56 in the screw opposed face 52, a plurality of guide grooves 54 are formed. One end of each of the guide grooves 54 is coupled to the communication hole 56, and each guide groove 54 extends in a spiral shape toward the outer circumference of the screw opposed face 52 from the communication hole 56. Each guide groove 54 has a function of guiding the shaping material to the communication hole 56.

Figure 5:
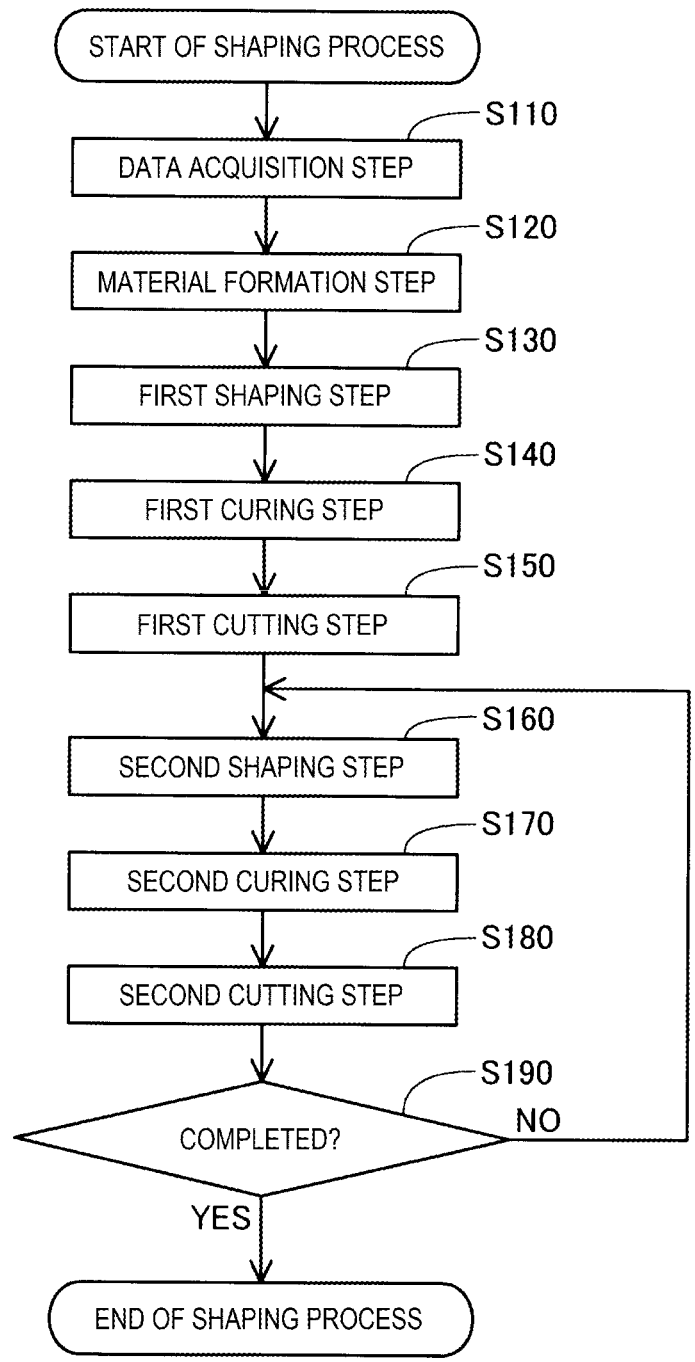
FIG. 5 is a flowchart showing contents of a production process in the first embodiment.

FIG. 5 is a flowchart showing contents of a shaping process for realizing the production of the three-dimensional shaped article OB in this embodiment. This process is executed when a predetermined start operation is performed by a user for an operation panel provided in the three-dimensional shaping apparatus 10 or the information processing apparatus 15 coupled to the three-dimensional shaping apparatus 10.

First, in a data acquisition step of Step S110, the controller 500 acquires shaping path data and cutting path data for realizing a process from the below-mentioned material formation step to second cutting step from the information processing apparatus 15. In this embodiment, the controller 500 acquires the shaping path data and the cutting path data from the information processing apparatus 15 through wired communication. The controller 500 may acquire the shaping path data and the cutting path data from the information processing apparatus 15 through wireless communication or may acquire the shaping path data and the cutting path data from the information processing apparatus 15 through a recording medium.

The shaping path data are data representing a shaping path that is a scanning path with respect to the shaping stage 300 of the nozzle 61 moving while ejecting the shaping material. The shaping path data also represent a target value of an ejection amount that is a flow rate of the shaping material ejected from the nozzle 61, a target value of the number of revolutions of the driving motor 32 for rotating the flat screw 40, a target value of the temperature of the heater 58 of the barrel 50, etc. in addition to the shaping path. The cutting path data are data representing a cutting path that is a scanning path with respect to the shaping stage 300 of the cutting tool 210 moving while cutting the stacked shaping material. The cutting path data also represent a target value of the number of revolutions of the cutting tool 210, a target value of the feed speed of the cutting tool 210, etc. in addition to the cutting path.

In this embodiment, the shaping path data and the cutting path data are generated by the information processing apparatus 15. The information processing apparatus 15 first reads three-dimensional shaping data in STL format, STEP format, IGES format, or the like generated by three-dimensional CAD software or the like. The three-dimensional shaping data are data representing the shape of the three-dimensional shaped article OB. Subsequently, the information processing apparatus 15 divides the shape of the three-dimensional shaped article OB represented by the three-dimensional shaping data into a plurality of parallel layers. The shaping material used for the shaping the three-dimensional shaped article OB is ejected from the nozzle 61 and shrunk when it is stacked on the shaping stage 300 and cured. Further, in this embodiment, the shaping material stacked on the shaping stage 300 is finished to a desired dimension or a desired surface roughness by a cutting process. Therefore, the information processing apparatus 15 sets the dimension of each of the divided layers larger so that a predetermined cutting allowance for the cutting process is ensured after shrinkage of the shaping material in consideration of the shrinkage ratio of the shaping material to be used for shaping the three-dimensional shaped article OB. The information processing apparatus 15 generates the shaping path data for shaping each layer in a state where the dimension is set larger, and the cutting path data for cutting the cutting allowance of each layer to be shaped according to the shaping path data.

Figure 6:
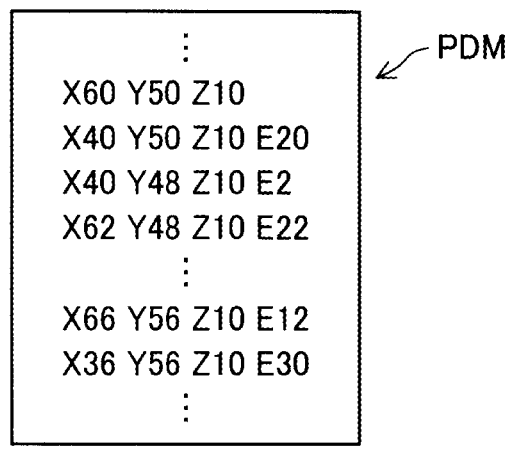
FIG. 6 is an explanatory view showing one example of shaping path data.

FIG. 6 is an explanatory view showing one example of the shaping path data in this embodiment. The shaping path data are read and interpreted sequentially from the top to the bottom in FIG. 6. In the shaping path data PDM shown in FIG. 6, first, a command to move the nozzle 61 to a coordinate (X, Y, Z)=(60, 50, 10) is set. This coordinate represents a relative position of the nozzle 61 to the shaping stage 300. Subsequently, a command to move the nozzle 61 from the coordinate (X, Y, Z)=(60, 50, 10) to a coordinate (X, Y, Z)=(40, 50, 10) and also to eject the shaping material in an amount of 20 units from the nozzle 61 while the nozzle 61 is moving in this segment is set. Further, a command to move the nozzle 61 from the coordinate (X, Y, Z)=(40, 50, 10) to a coordinate (X, Y, Z)=(40, 48, 10) and also to eject the shaping material in an amount of 2 units from the nozzle 61 while the nozzle 61 is moving in this segment is set. A description of a middle process is omitted, and thereafter, a command to move the nozzle 61 from a coordinate (X, Y, Z)=(66, 56, 10) to a coordinate (X, Y, Z)=(36, 56, 10) and also to eject the shaping material in an amount of 30 units from the nozzle 61 while the nozzle 61 is moving in this segment is set.

Figure 7:
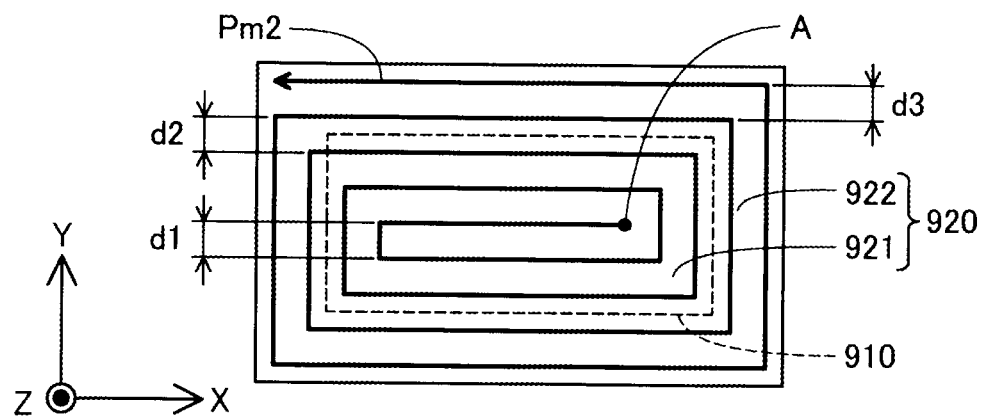
FIG. 7 is a top view showing a second shaping path in the first embodiment.

FIG. 7 is a top view showing one example of a second shaping path Pm2 in this embodiment. In FIG. 7, a first portion 910 that is a portion of the three-dimensional shaped article OB and is shaped on the shaping stage 300 is shown with a broken line, and a second portion 920 that is a portion of the three-dimensional shaped article OB and that is shaped on the first portion 910 is shown with a solid line. In FIG. 7, the second shaping path Pm2 for shaping the second portion 920 is shown with a bold line. In the example shown in FIG. 7, after the first portion 910 shaped and shrunk on the shaping stage 300 is subjected to the cutting process, the second portion 920 is shaped on the first portion 910. The first portion 910 in FIG. 7 is shown in the size when the second portion 920 is shaped. That is, the first portion 910 in FIG. 7 is shown in the size after it is shaped and shrunk on the shaping stage 300 and further subjected to the cutting process.

A region of the second portion 920 overlapping with the first portion 910 when the first portion 910 in the size when the second portion 920 is shaped and the second portion 920 are projected to a face parallel to the shaping stage 300 is referred to as an overlapping portion 921. A region of the second portion 920 that does not overlap with the first portion 910 when the first portion 910 in the size when the second portion 920 is shaped and the second portion 920 are projected to a face parallel to the shaping stage 300, that forms a space between the region and the first portion 910, and that is in contact with the overlapping portion 921 is referred to as a non-overlapping portion 922. The forming a space between the first portion 910 and the non-overlapping portion 922 of the second portion 920 means that a support material or the like is not disposed between the first portion 910 and the non-overlapping portion 922 of the second portion 920, and the non-overlapping portion 922 has a form projecting in an eaves-like manner from the overlapping portion 921 on the first portion 910. The forming a space between the first portion 910 and the non-overlapping portion 922 of the second portion 920 can also be said that the non-overlapping portion 922 has a form of being supported only by the overlapping portion 921. Note that the support material is a member for maintaining the shape of the three-dimensional shaped article OB during shaping and means a member to be removed after completion of the shaping.

The information processing apparatus 15 determines whether the non-overlapping portion 922 is generated in the second portion 920 using the three-dimensional shaping data of the three-dimensional shaped article OB divided into layers, and when it is determined that the non-overlapping portion 922 is generated in the second portion 920, a start point A of the second shaping path Pm2 for shaping the second portion 920 is set in the overlapping portion 921. When it is determined that the non-overlapping portion 922 is generated in the second portion 920, the information processing apparatus 15 sets the second shaping path Pm2 for shaping the second portion 920 so that the non-overlapping portion 922 is shaped by ejecting the shaping material so as to be in contact with the overlapping portion 921 after the overlapping portion 921 is shaped by ejecting the shaping material on the first portion 910. In this embodiment, the second shaping path Pm2 is set so as to extent toward the outer circumference of the overlapping portion 921 while surrounding the outer circumference of the start point A.

In this embodiment, an interval d1 between adjacent portions of the second shaping path Pm2 disposed in the overlapping portion 921 is set equal to the nozzle diameter Dn. That is, in the overlapping portion 921, the second shaping path Pm2 is set so that the shaping material ejected from the nozzle 61 comes in contact with the previously disposed shaping material. An interval d2 between a portion of the second shaping path Pm2 disposed in the non-overlapping portion 922 and an adjacent portion of the second shaping path Pm2 disposed in the overlapping portion 921 is set narrower than the interval d1. An interval d3 between adjacent portions of the second shaping path Pm2 disposed in the non-overlapping portion 922 is set equal to the interval d2. That is, in the non-overlapping portion 922, the second shaping path Pm2 is set so that a part of the shaping material ejected from the nozzle 61 overlaps on the previously disposed shaping material.

With reference to FIG. 5, subsequently, in the material formation step of Step S120, the controller 500 controls the rotation of the flat screw 40 and heating by the built-in heater 58 in the barrel 50 to melt the material, thereby forming the shaping material. This control is also referred to as "material formation control". In the material formation step, the material stored in the material storage portion 20 is supplied to the material introduction portion 48 from the side face 43 of the rotating flat screw 40 through the supply channel 22. The material supplied into the material introduction portion 48 is conveyed into the spiral portion 47 by the rotation of the flat screw 40. At least a part of the material conveyed into the spiral portion 47 is melted by the rotation of the flat screw 40 and heating by the heater 58 to form the shaping material in a paste form having fluidity. The formed shaping material is conveyed to the central portion 46 in the spiral portion 47 and supplied to the nozzle 61 from the communication hole 56. The shaping material continues to be formed while performing the below-mentioned first shaping step or second shaping step.

Figure 8:
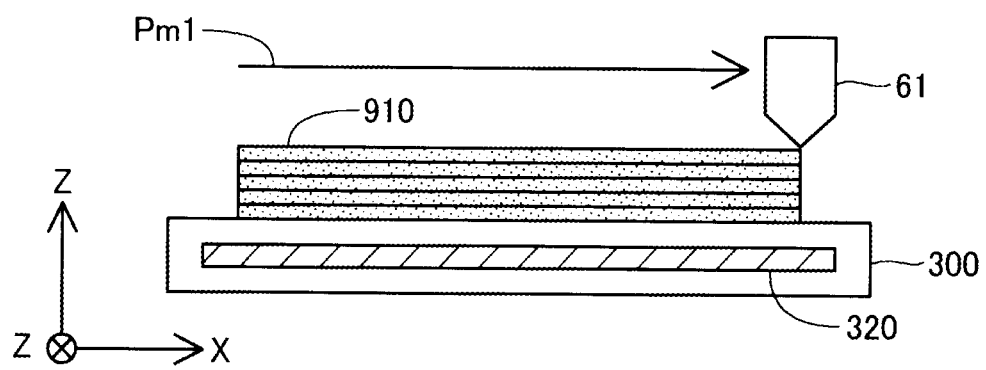
FIG. 8 is a process view showing a first shaping step in the first embodiment.

FIG. 8 is a process view showing a first shaping step in this embodiment. With reference to FIGS. 5 and 8, in the first shaping step of Step S130, the controller 500 controls the ejection unit 100 and the moving mechanism 400 to stack the shaping material on the shaping stage 300 from the nozzle 61, thereby shaping the first portion 910 of the three-dimensional shaped article OB. This control is also referred to as "first shaping control". The first portion 910 is a portion of the three-dimensional shaped article OB stacked on the shaping stage 300. By stacking only one layer or a plurality of layers of the shaping material, the first portion 910 is formed. In this embodiment, by stacking 5 layers of the shaping material, the first portion 910 is formed. In the first shaping step, the controller 500 controls the ejection unit 100 and the moving mechanism 400 according to the first shaping path Pm1 for shaping the first portion 910 represented in the shaping path data acquired in the data acquisition step. Prior to the first shaping step, the temperature of the shaping stage 300 may be controlled so that the temperature does not exceed the glass transition point of the shaping material by controlling a temperature-controlled heater 320 built in the shaping stage 300 by the controller 500. In this case, by controlling the temperature of the shaping stage 300, the adherence between the first portion 910 and the shaping stage 300 is improved.

Figure 9:
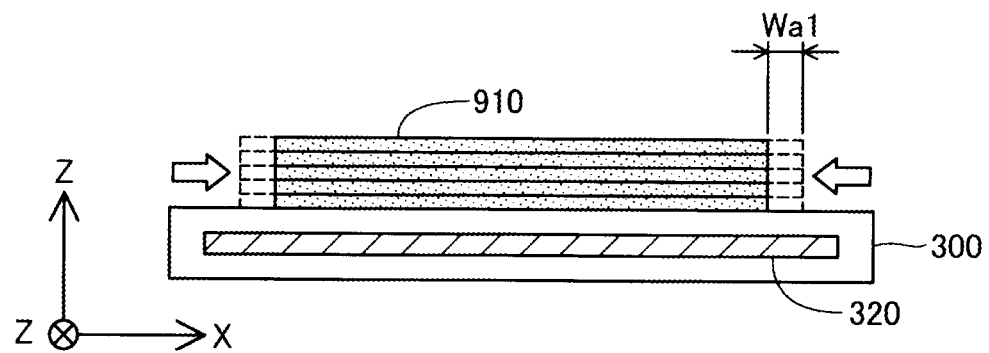
FIG. 9 is a process view showing a first curing step in the first embodiment.

FIG. 9 is a process view showing a first curing step in this embodiment. With reference to FIGS. 5 and 9, in the first curing step of Step S140, the controller 500 cures the first portion 910 stacked on the shaping stage 300. In this embodiment, the controller 500 cures the shaping material of the first portion 910 by waiting for the process until the shaping material plasticized in the first portion 910 is cured by being deprived of heat by the shaping stage 300 or the atmosphere. When the shaping material ejected from the nozzle 61 is promptly cooled and cured, the controller 500 need not wait for the process. The first portion 910 is shrunk due to shrinkage when the shaping material is cured. In FIG. 9, the first portion 910 before shrinkage is shown with a broken line, and the first portion 910 after shrinkage is shown with a solid line. Due to the shrinkage of the shaping material, the end portion of the first portion 910 moves by a distance with a length of Wa1 toward the center of the first portion 910. Incidentally, a blower is provided in the three-dimensional shaping apparatus 10, and the controller 500 may cure the shaping material of the first portion 910 by blowing air to the shaping material in the first portion 910 using the blower.

Figure 10:
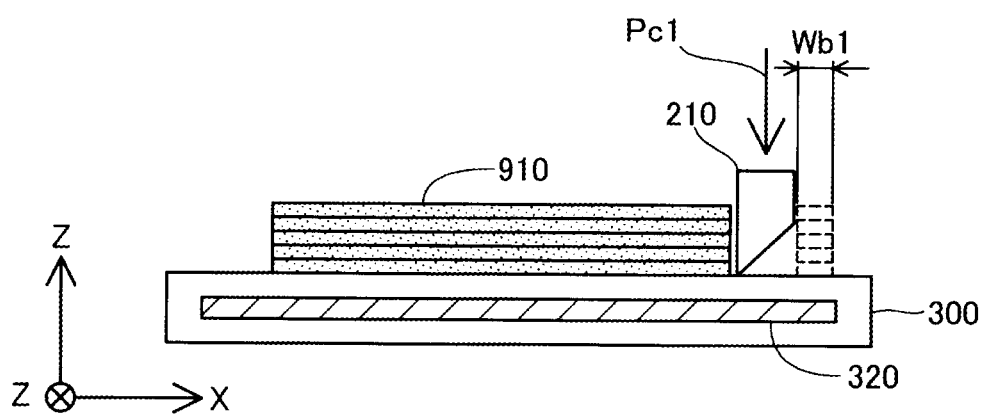
FIG. 10 is a process view showing a first cutting step in the first embodiment.

FIG. 10 is a process view showing a first cutting step in this embodiment. With reference to FIGS. 5 and 10, in the first cutting step of Step S150, the controller 500 controls the cutting unit 200 and the moving mechanism 400, thereby cutting the surface of the first portion 910 with the cutting tool 210. This control is also referred to as "first cutting control". The controller 500 controls the cutting unit 200 and the moving mechanism 400 according to a first cutting path Pc1 for cutting the first portion 910 represented in the cutting path data acquired in the data acquisition step, thereby cutting the first portion 910 so that the first portion 910 has a desired dimension or a desired surface roughness. In FIG. 10, a state where the first portion 910 is cut over a length of Wb1 from the end portion is shown as one example.

Figure 11:
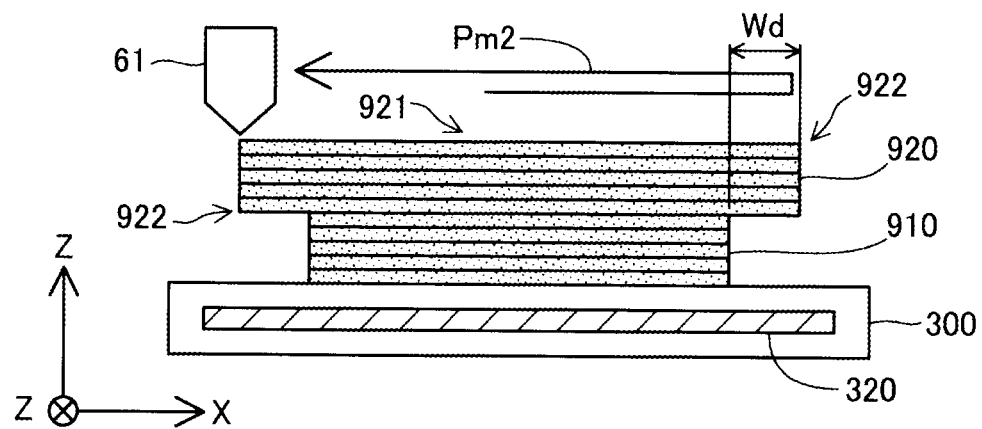
FIG. 11 is a process view showing a second shaping step in the first embodiment.

FIG. 11 is a process view showing a second shaping step in this embodiment. With reference to FIGS. 5 and 11, in the second shaping step of Step S160, the controller 500 controls the ejection unit 100 and the moving mechanism 400, to stack the shaping material on the first portion 910 after being subjected to cutting, thereby shaping the second portion 920 having the overlapping portion 921 and the non-overlapping portion 922. This control is also referred to as "second shaping control". The second portion 920 is a portion of the three-dimensional shaped article OB stacked on the first portion 910. By stacking only one layer or a plurality of layers of the shaping material, the second portion 920 is formed. In this embodiment, by stacking 5 layers of the shaping material, the second portion 920 is formed. In the second shaping step, the controller 500 controls the ejection unit 100 and the moving mechanism 400 according to the second shaping path Pm2 for shaping the second portion 920 represented in the shaping path data acquired in the data acquisition step. A length Wd of the non-overlapping portion 922 projecting from the end portion of the first portion 910 is larger than the nozzle diameter Dn. The length Wd is preferably set within a range where the non-overlapping portion 922 does not hang down by its own weight.

Figure 12:
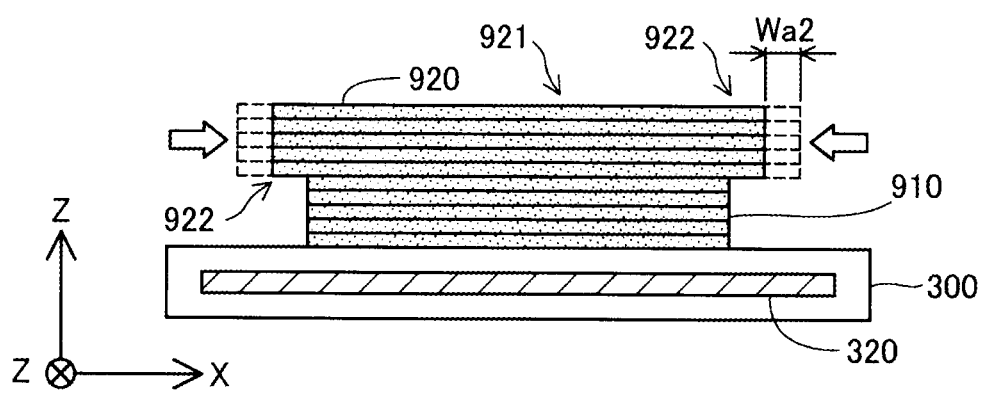
FIG. 12 is a process view showing a second curing step in the first embodiment.

FIG. 12 is a process view showing a second curing step in this embodiment. With reference to FIGS. 5 and 12, in the second curing step of Step S170, the controller 500 cures the shaping material of the second portion 920. In this embodiment, the controller 500 cures the shaping material of the second portion 920 by waiting until the shaping material plasticized in the second portion 920 is cured by being deprived of heat by the first portion 910 or the atmosphere. When the shaping material ejected from the nozzle 61 is promptly cooled and cured, the controller 500 need not wait for the process. The second portion 920 is shrunk due to shrinkage when the shaping material is cured. In FIG. 12, the second portion 920 before shrinkage is shown with a broken line, and the second portion 920 after shrinkage is shown with a solid line. Due to the shrinkage of the shaping material, the end portion of the second portion 920 moves by a distance with a length of Wa2 toward the center of the second portion 920. Incidentally, a blower is provided in the three-dimensional shaping apparatus 10, and the controller 500 may cure the shaping material of the second portion 920 by blowing air to the shaping material in the second portion 920 using the blower.

Figure 13:
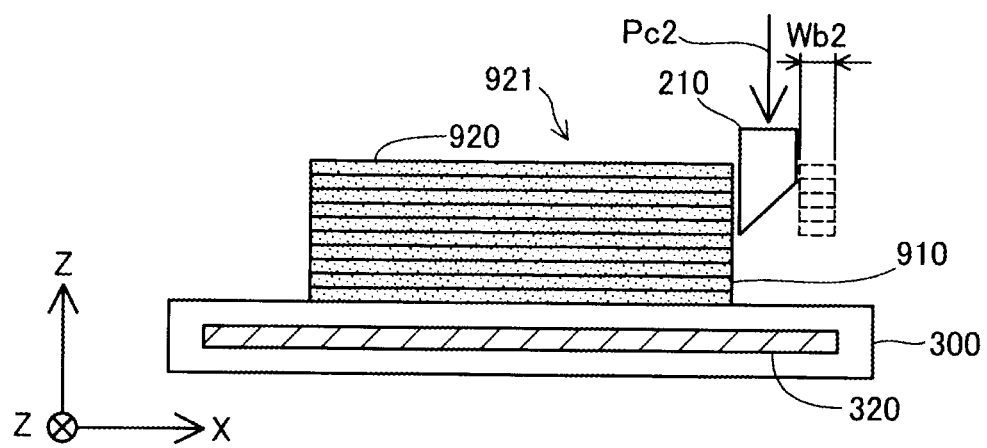
FIG. 13 is a process view showing a second cutting step in the first embodiment.

FIG. 13 is a process view showing a second cutting step in this embodiment. With reference to FIGS. 5 and 13, in the second cutting step of Step S180, the controller 500 controls the cutting unit 200 and the moving mechanism 400, thereby cutting the surface of the second portion 920. This control is also referred to as "second cutting control". The controller 500 controls the cutting unit 200 and the moving mechanism 400 according to a second cutting path Pc2 for cutting the second portion 920 represented in the cutting path data acquired in the data acquisition step, thereby cutting the second portion 920 so that the second portion 920 has a desired dimension or a desired surface roughness. In FIG. 13, a state where the second portion 920 is cut over a length of Wb2 from the end portion is shown as one example. In this example, the second portion 920 is cut so that a face of the second portion 920 and a face of the first portion 910 after being subjected to cutting in the first cutting step become a continuous face.

With reference to FIG. 5, in Step S190, the controller 500 determines whether the three-dimensional shaped article OB is completed. Step S190 can also be referred to as "completion determination step". In this embodiment, when scanning of all the shaping path represented in the acquired shaping path data and all the cutting path represented in the acquired cutting path data is completed, the controller 500 determines that the three-dimensional shaped article OB is completed. When it is determined that the three-dimensional shaped article OB is completed in Step S190, the controller 500 terminates this process. On the other hand, when it is not determined that the three-dimensional shaped article OB is completed in Step S190, the controller 500 repeats the process from the second shaping step to the second cutting step for forming upper layers than the second portion 920. The controller 500 repeats the process from the second shaping step to the second cutting step until it is determined that the three-dimensional shaped article OB is completed.

According to the method for producing the three-dimensional shaped article OB of this embodiment described above, when the second portion 920 is shaped in the second shaping step, the non-overlapping portion 922 projecting from the first portion 910 is shaped, and therefore, the second portion 920 can be prevented from becoming smaller than the target dimension in design accompanying shrinkage of the shaping material. Accordingly, the shaping accuracy of the three-dimensional shaped article OB can be improved.

Further, in this embodiment, after the second portion 920 is shaped in the second shaping step, the second portion 920 is cut in the second cutting step. Therefore, the shaping accuracy of the three-dimensional shaped article OB can be further improved.

Further, in this embodiment, the second shaping path Pm2 is set so that a projecting amount Wd of the second portion 920 becomes an amount taking into consideration the shrinkage amount when the second portion 920 is cured and the cutting allowance of the second portion 920. Therefore, after the second portion 920 is cured and shrunk, the cutting allowance of the second portion 920 can be reliably ensured.

Further, in this embodiment, the non-overlapping portion 922 is shaped according to the second shaping path Pm2 surrounding the outer circumference of the overlapping portion 921, and therefore, the second portion 920 can be shaped with a shaping path having a minimum necessary length. Accordingly, a time required for shaping the three-dimensional shaped article OB can be shortened.

Further, in this embodiment, the interval d3 between adjacent portions of the second shaping path Pm2 disposed in the non-overlapping portion 922 is set narrower than the interval d1 between adjacent portions of the second shaping path Pm2 disposed in the overlapping portion 921. Therefore, the non-overlapping portion 922 is shaped so that a part of the shaping material ejected from the nozzle 61 overlaps on the previously disposed shaping material, and thus, the non-overlapping portion 922 can be prevented from hanging down.

Further, in this embodiment, the shaping material is formed by melting the material using the flat screw 40 whose height along the central axis RX is small, and therefore, the melting portion 30 can be miniaturized. Accordingly, the three-dimensional shaped article OB can be shaped using the small three-dimensional shaping apparatus 10.

In this embodiment, an ABS resin material in a pellet form is used, however, as the material used in the ejection unit 100, for example, a material shaping a three-dimensional shaped article using any of various materials such as a material having thermoplasticity, a metal material, and a ceramic material as a main material can also be adopted. Here, the "main material" refers to a material mainly used for forming the shape of the three-dimensional shaped article and means a material whose content is 50 wt % or more in the three-dimensional shaped article. In the above-mentioned shaping material, a material obtained by melting such a main material singly, or a material formed into a paste by melting a part of the components contained together with the main material is included.

When a material having thermoplasticity is used as the main material, the shaping material is formed by plasticization of the material in the melting portion 30. The "plasticization" refers to melting by applying heat to the material having thermoplasticity.

As the material having thermoplasticity, for example, any one or a combination of two or more of the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone In the material having thermoplasticity, a pigment, a metal, a ceramic, or other than these, an additive such as a wax, a flame retardant, an antioxidant, or a heat stabilizer, or the like may be mixed. The material having thermoplasticity is converted into a molten state by plasticization due to the rotation of the flat screw 40 and heating by the heater 58 in the melting portion 30. The shaping material formed in this manner is cured by decreasing the temperature after being ejected from the nozzle hole 62.

The material having thermoplasticity is desirably injected from the nozzle hole 62 in a completely molten state by being heated to a temperature not lower than the glass transition point thereof. For example, an ABS resin has a glass transition point of about 120° C. and the temperature thereof when it is injected from the nozzle hole 62 is desirably about 200° C. In order to inject the shaping material in a high temperature state in this manner, a heater may be provided around the nozzle hole 62.

In the ejection unit 100, in place of the above-mentioned material having thermoplasticity, for example, the following metal material may be used as the main material. In this case, it is desirable that a component melting when forming the shaping material is mixed in a powder material obtained by pulverizing the following metal material, and the resulting material is fed to the melting portion 30.

Examples of Metal Material single metals of magnesium (Mg), iron (Fe), cobalt (Co), chromium (Cr), aluminum (Al), titanium (Ti), copper (Cu), and nickel (Ni), or alloys containing one or more of these metals Examples of Alloy a maraging steel, stainless steel, cobalt-chromium-molybdenum, a titanium alloy, a nickel alloy, an aluminum alloy, a cobalt alloy, and a cobalt-chromium alloy In the ejection unit 100, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material disposed in the shaping stage 300 may be cured by, for example, irradiation with a laser or sintering with hot air or the like.

The powder material of the metal material or the ceramic material to be fed to the material storage portion 20 may be a mixed material obtained by mixing a plurality of types of single metal powders or alloy powders or ceramic material powders. Further, the powder material of the metal material or the ceramic material may be coated with, for example, a thermoplastic resin as exemplified above or a thermoplastic resin other than those exemplified above. In this case, the material may be configured to exhibit fluidity by melting the thermoplastic resin in the melting portion 30.

To the powder material of the metal material or the ceramic material to be fed to the material storage portion 20, for example, a solvent as described below can also be added. As the solvent, one type or a combination of two or more types selected from the following solvents can be used.

Examples of Solvent water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl n-butyl ketone, diisopropyl ketone, and acetyl acetone, alcohols such as ethanol, propanol, and butanol, tetra-alkyl ammonium acetates, sulfoxide-based solvents such as dimethyl sulfoxide and diethyl sulfoxide, pyridine-based solvents such as pyridine, γ-picoline, and 2,6-lutidine, tetra-alkyl ammonium acetates (for example, tetra-butyl ammonium acetate, etc.), ionic liquids such as butyl carbitol acetate, and the like In addition thereto, for example, a binder as described below can also be added to the powder material of the metal material or the ceramic material to be fed to the material storage portion 20.

Figure 14:
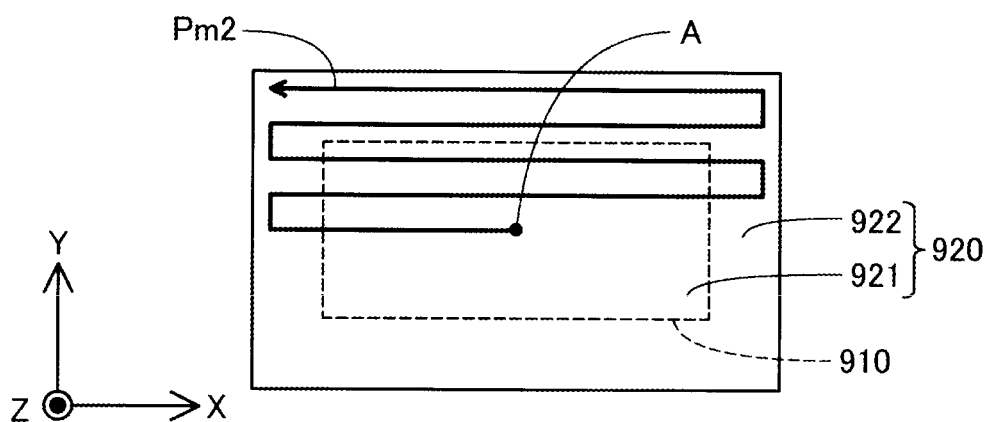
FIG. 14 is a top view showing a first example of a second shaping path in another embodiment.
Figure 15:
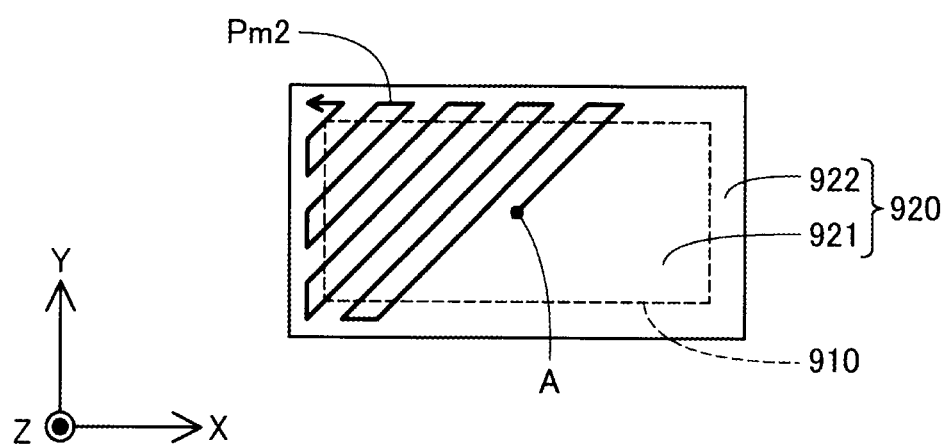
FIG. 15 is a top view showing a second example of a second shaping path in another embodiment.

Examples of Binder an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), or other thermoplastic resins B. Other Embodiments FIG. 14 is a top view showing a first example of the second shaping path Pm2 in another embodiment. FIG. 15 is a top view showing a second example of the second shaping path Pm2 in another embodiment. As shown in FIG. 14, the second shaping path Pm2 may be set so that the overlapping portion 921 and the non-overlapping portion 922 are shaped while reciprocating in a direction parallel to one side of a peripheral edge of the first portion 910. Further, as shown in FIG. 15, the second shaping path Pm2 may be set so that the overlapping portion 921 and the non-overlapping portion 922 are shaped while reciprocating in a direction crossing one side of a peripheral edge of the first portion 910. In these cases, the projecting amount Wd from the first portion 910 of the non-overlapping portion 922 can be set to a different amount depending on a region in the three-dimensional shaped article OB.

In the above-mentioned embodiment, the controller 500 performs the first cutting step by executing the first cutting process, and performs the second cutting step by executing the second cutting process. On the other hand, the controller 500 need not execute at least one of the first cutting process and the second cutting process. That is, at least one of the first cutting step and the second cutting step need not be performed.

In the above-mentioned embodiment, the interval d2 between a portion of the second shaping path Pm2 disposed in the non-overlapping portion 922 and an adjacent portion of the second shaping path Pm2 disposed in the overlapping portion 921 is set narrower than the interval d1 between adjacent portions of the second shaping path Pm2 disposed in the overlapping portion 921. The interval d3 between adjacent portions the second shaping path Pm2 disposed in the non-overlapping portion 922 is set equal to the interval d2. On the other hand, the interval d2 may be set equal to the interval d1, or the interval d3 may be set narrower than the interval d2.

D. Other Aspects

The present disclosure is not limited to the above-mentioned embodiments, but can be realized in various aspects without departing from the gist thereof. For example, the present disclosure can also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as essential features in the present specification.

(1) According to a first aspect of the present disclosure, a method for producing a three-dimensional shaped article is provided. This method for producing a three-dimensional shaped article includes a first shaping step of shaping a first portion of the three-dimensional shaped article by ejecting a shaping material to a stage, and a second shaping step of shaping a second portion of the three-dimensional shaped article having an overlapping portion overlapping with the first portion, and a non-overlapping portion that does not overlap with the first portion, that forms a space between the same and the first portion, and that is in contact with the overlapping portion at one end. In the second shaping step, the overlapping portion is shaped by ejecting the shaping material onto the first portion, and thereafter, the non-overlapping portion is shaped by ejecting the shaping material so as to be in contact with the overlapping portion.

According to the method for producing a three-dimensional shaped article of this aspect, the non-overlapping portion projecting from the first portion can be shaped when shaping the second portion, and therefore, the second portion can be prevented from becoming smaller than the target dimension in design accompanying shrinkage of the shaping material. Accordingly, the shaping accuracy of the three-dimensional shaped article can be improved.

(2) The method for producing a three-dimensional shaped article of the above aspect may include a cutting step of cutting at least the non-overlapping portion after the second shaping step.

According to the method for producing a three-dimensional shaped article of this aspect, the second portion can be finished by cutting, and therefore, the shaping accuracy of the three-dimensional shaped article can be further improved.

(3) In the method for producing a three-dimensional shaped article of the above aspect, the cutting step may be performed after the second portion is cured and shrunk, and in the second shaping step, the non-overlapping portion may be shaped to a size configured to ensure a cutting allowance for cutting the non-overlapping portion in the cutting step.

According to the method for producing a three-dimensional shaped article of this aspect, the cutting allowance can be reliably ensured even after the second portion is cured and shrunk.

(4) In the method for producing a three-dimensional shaped article of the above aspect, a path for ejecting the shaping material for shaping the non-overlapping portion in the second shaping step may be a path surrounding the overlapping portion.

According to the method for producing a three-dimensional shaped article of this aspect, the non-overlapping portion is shaped in the path surrounding the overlapping portion, and therefore, shaping can be achieved with a path having a minimum necessary length. Accordingly, a time required for shaping the three-dimensional shaped article can be shortened.

(5) In the method for producing a three-dimensional shaped article of the above aspect, a path for ejecting the shaping material for shaping the non-overlapping portion in the second shaping step may be a path reciprocating parallel to a peripheral edge of the overlapping portion.

According to the method for producing a three-dimensional shaped article of this aspect, the projecting amount from the first portion of the non-overlapping portion can be set to a different amount depending on a region in the three-dimensional shaped article.

(6) In the method for producing a three-dimensional shaped article of the above aspect, an interval between the paths for ejecting the shaping material for shaping the non-overlapping portion in the second shaping step may be narrower than an interval between the paths for ejecting the shaping material for shaping the overlapping portion.

According to the method for producing a three-dimensional shaped article of this aspect, the non-overlapping portion is shaped so that a part of the shaping material ejected overlaps on the previously disposed shaping material, and thus, the non-overlapping portion can be prevented from hanging down.

(7) According to a second aspect of the present disclosure, a three-dimensional shaping apparatus is provided. This three-dimensional shaping apparatus includes a melting portion melting a material to form a shaping material, an ejection portion ejecting the shaping material, a stage where the shaping material ejected from the ejection portion is stacked, a moving mechanism changing a relative position of the ejection portion to the stage, and a controller controlling the melting portion and the moving mechanism, thereby shaping a three-dimensional shaped article including a first portion and a second portion having an overlapping portion overlapping with the first portion, and a non-overlapping portion that does not overlap with the first portion, that forms a space between the same and the first portion, and that is in contact with the overlapping portion at one end. The controller controls the melting portion and the moving mechanism according to a shaping path for shaping the overlapping portion by ejecting the shaping material onto the first portion, and thereafter, shaping the non-overlapping portion by ejecting the shaping material so as to be in contact with the overlapping portion.

According to the three-dimensional shaping apparatus of this aspect, the non-overlapping portion projecting from the first portion can be shaped when shaping the second portion, and therefore, the second portion can be prevented from becoming smaller than the target dimension in design accompanying shrinkage of the shaping material. Accordingly, the shaping accuracy of the three-dimensional shaped article can be improved.

(8) In the three-dimensional shaping apparatus of the above aspect, the melting portion may include a flat screw having a groove formed face in which a groove is formed, and a barrel having a screw opposed face which is opposed to the groove formed face and in which a communication hole communicating with the ejection portion is formed at a center, and a heating portion, and the melting portion may melt the material by rotation of the flat screw and heating by the heating portion to form the shaping material, and may supply the shaping material to the ejection portion from the communication hole.

According to the three-dimensional shaping apparatus of this aspect, the shaping material is formed by melting the material using the flat screw, and therefore, the melting portion can be miniaturized. Accordingly, the three-dimensional shaping apparatus can be miniaturized.

The present disclosure can also be realized in various aspects other than the method for producing a three-dimensional shaped article. For example, it can be realized in aspects of a three-dimensional shaping apparatus, a three-dimensional shaping system, a three-dimensional shaping apparatus controlling method, an information processing apparatus, a data generation method, etc.

What is claimed is:

1. A method for producing a three-dimensional shaped article, comprising:
    a first shaping step of shaping a first portion of the three-dimensional shaped article by ejecting a shaping material to a stage;
    a second shaping step of shaping a second portion of the three-dimensional shaped article, wherein
        the second portion is above the first portion,
        the second portion includes an overlapping portion and a non-overlapping portion,
        the overlapping portion overlaps with the first portion along an X-axis direction,
        the non-overlapping portion is in contact with the overlapping portion at one end,
        the non-overlapping portion is a portion that projects in the X-axis direction from both ends of the overlapping portion,
        each of the overlapping portion and the non-overlapping portion is parallel to the stage in the X-axis direction,
        in the second shaping step, the overlapping portion is shaped by ejecting the shaping material onto the first portion, and thereafter, the non-overlapping portion is shaped by ejecting the shaping material so as to be in contact with the overlapping portion, and
        in the second shaping step, the non-overlapping portion is shaped to a size configured to ensure a cutting allowance for cutting the non-overlapping portion in a cutting step; and
    the cutting step of cutting at least the non-overlapping portion after the second shaping step, wherein
        the cutting step is performed after the second portion is cured and shrunk.

2. The method for producing the three-dimensional shaped article according to claim 1, wherein a path for ejecting the shaping material for shaping the non-overlapping portion in the second shaping step is a path surrounding the overlapping portion.

3. The method for producing the three-dimensional shaped article according to claim 1, wherein a path for ejecting the shaping material for shaping the non-overlapping portion in the second shaping step is a path reciprocating parallel to a peripheral edge of the overlapping portion.

4. The method for producing the three-dimensional shaped article according to claim 1, wherein an interval between paths for ejecting the shaping material for shaping the non-overlapping portion in the second shaping step is narrower than an interval between paths for ejecting the shaping material for shaping the overlapping portion.

* * * * *